May 20, 1930. W. LEWIS 1,759,825
ROLL-OVER TRAVERSING MECHANISM FOR MOLDING MACHINES
Filed May 26, 1927 6 Sheets-Sheet 1

WITNESSES

INVENTOR
Wilfred Lewis
BY
Augustus B Stoughton
ATTORNEY.

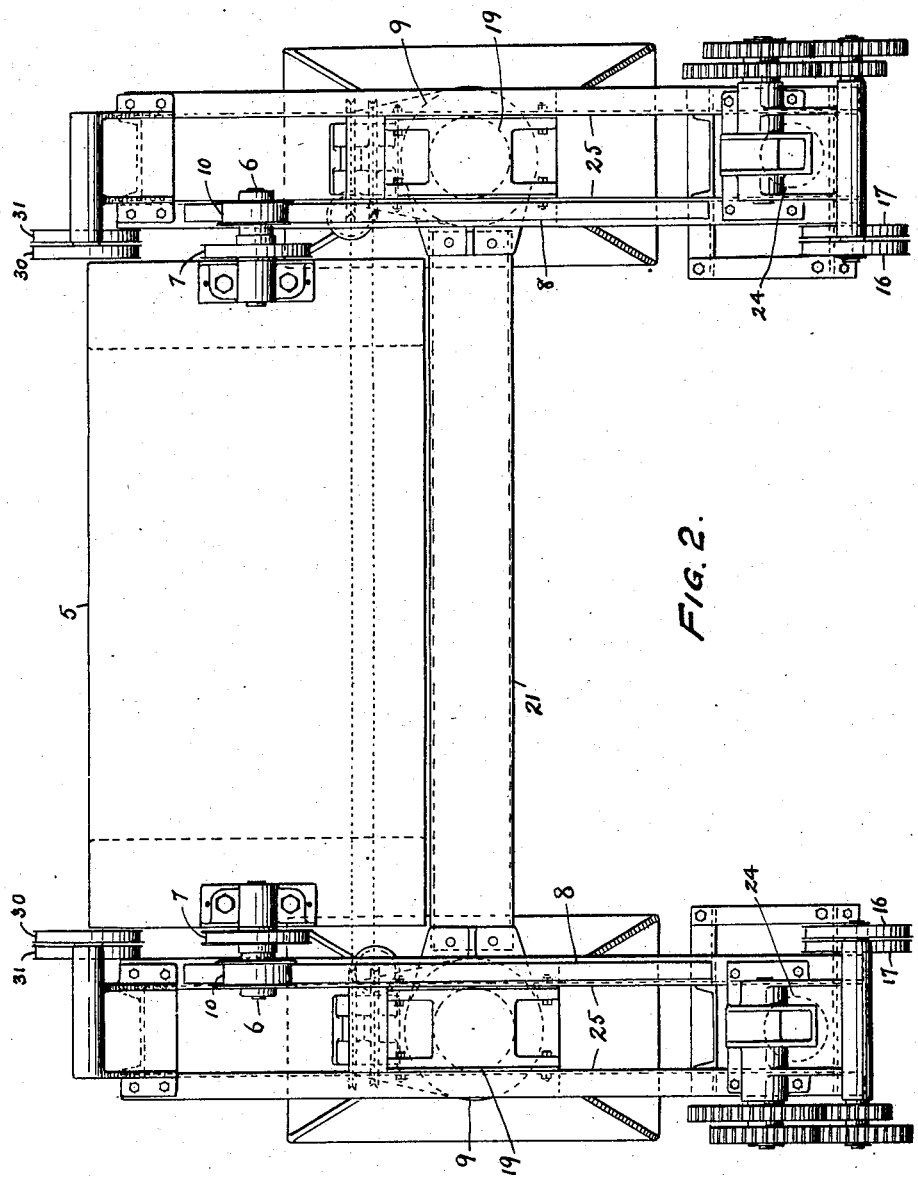

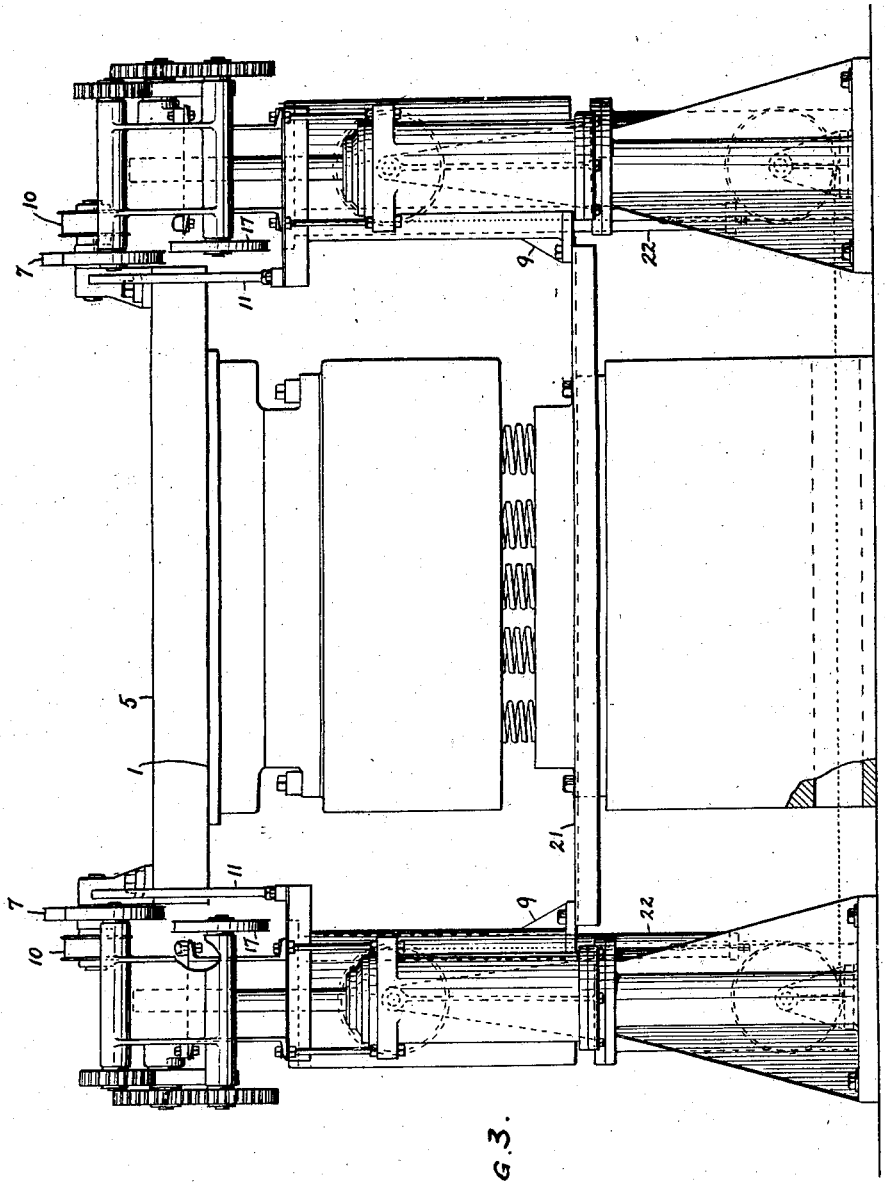

May 20, 1930.  W. LEWIS  1,759,825
ROLL-OVER TRAVERSING MECHANISM FOR MOLDING MACHINES
Filed May 26, 1927  6 Sheets-Sheet 4
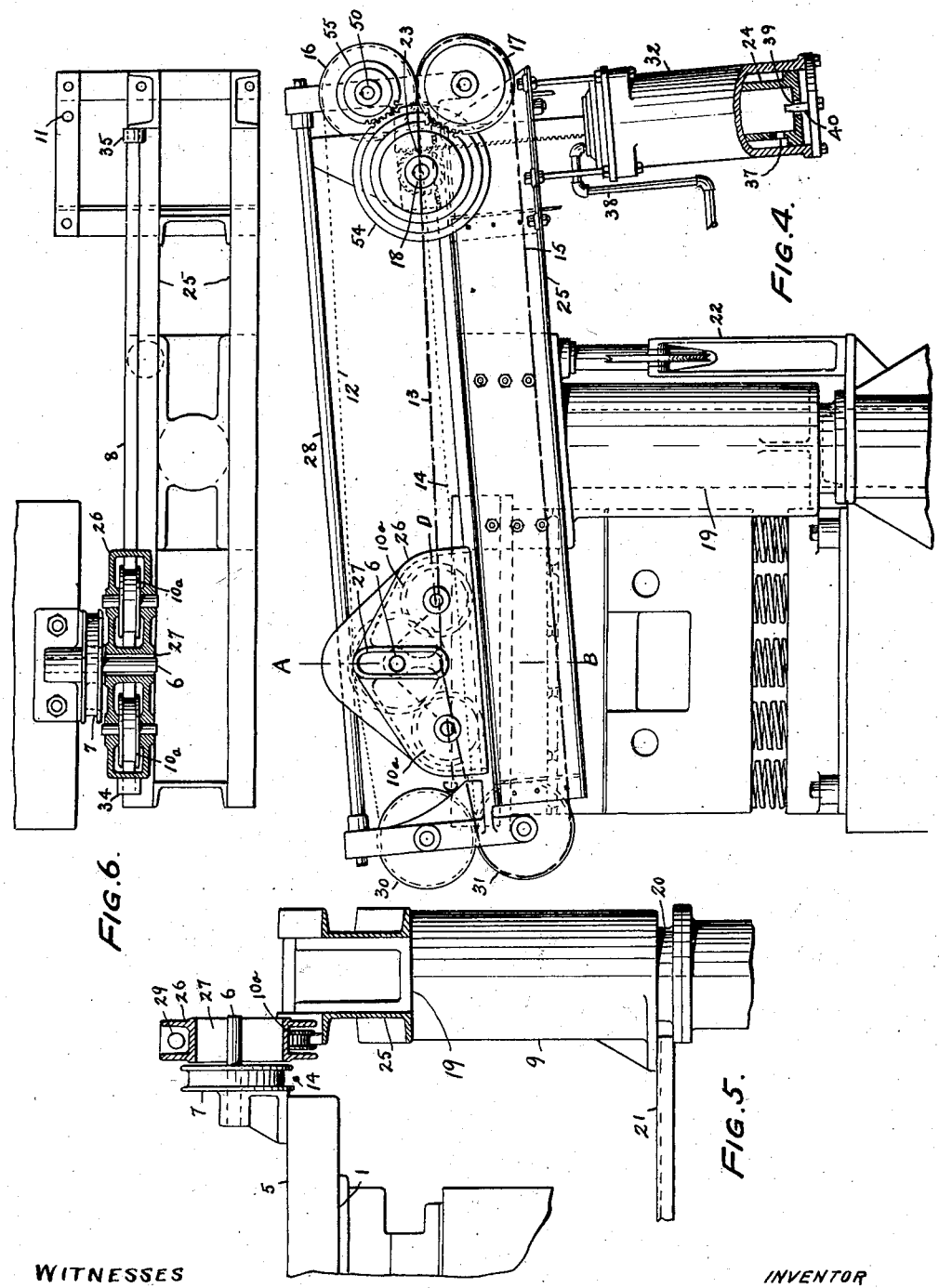
WITNESSES
INVENTOR
Wilfred Lewis
BY
Augustus B Stoughton
ATTORNEY.

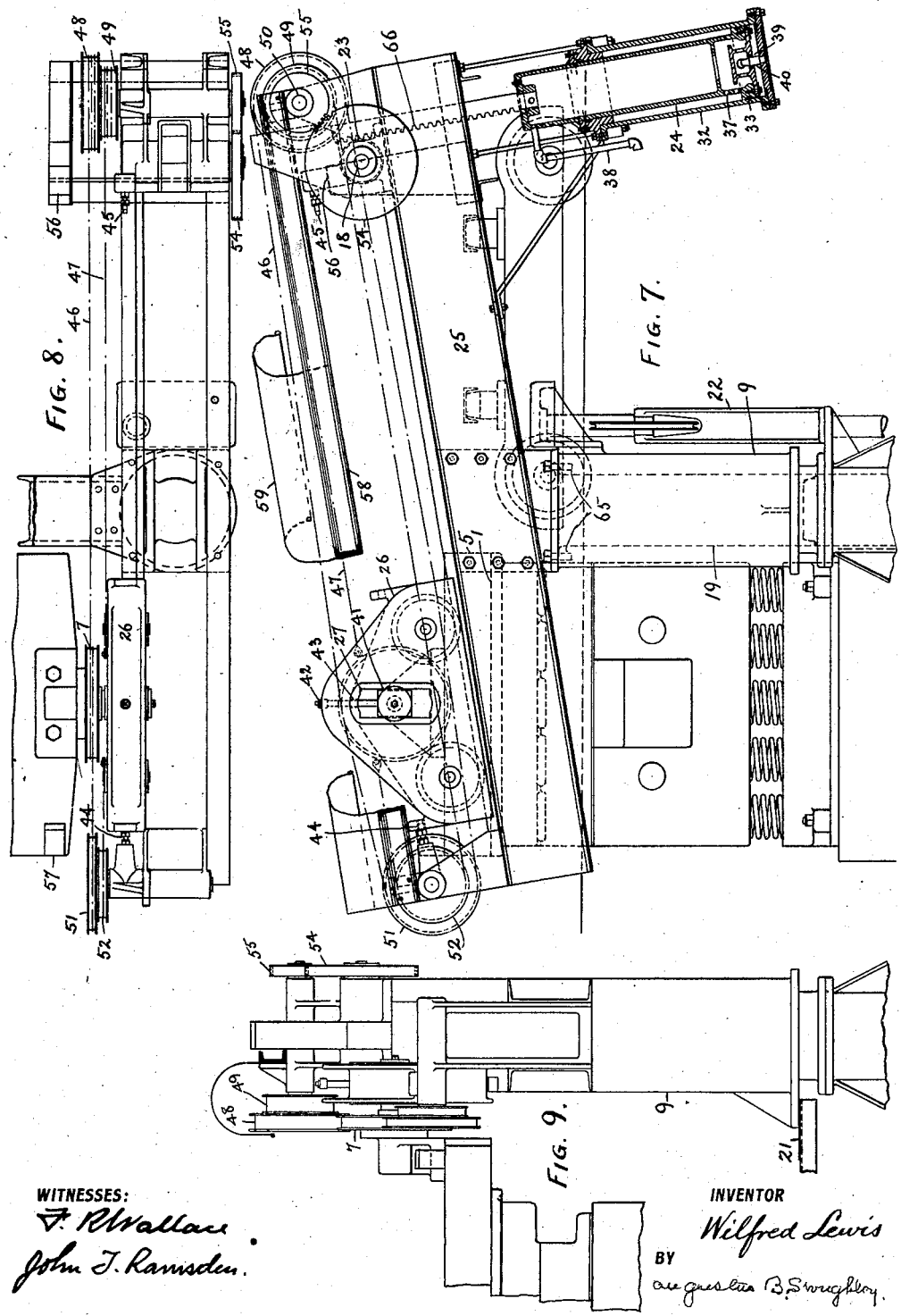

May 20, 1930.    W. LEWIS    1,759,825
ROLL-OVER TRAVERSING MECHANISM FOR MOLDING MACHINES
Filed May 26, 1927    6 Sheets-Sheet 6
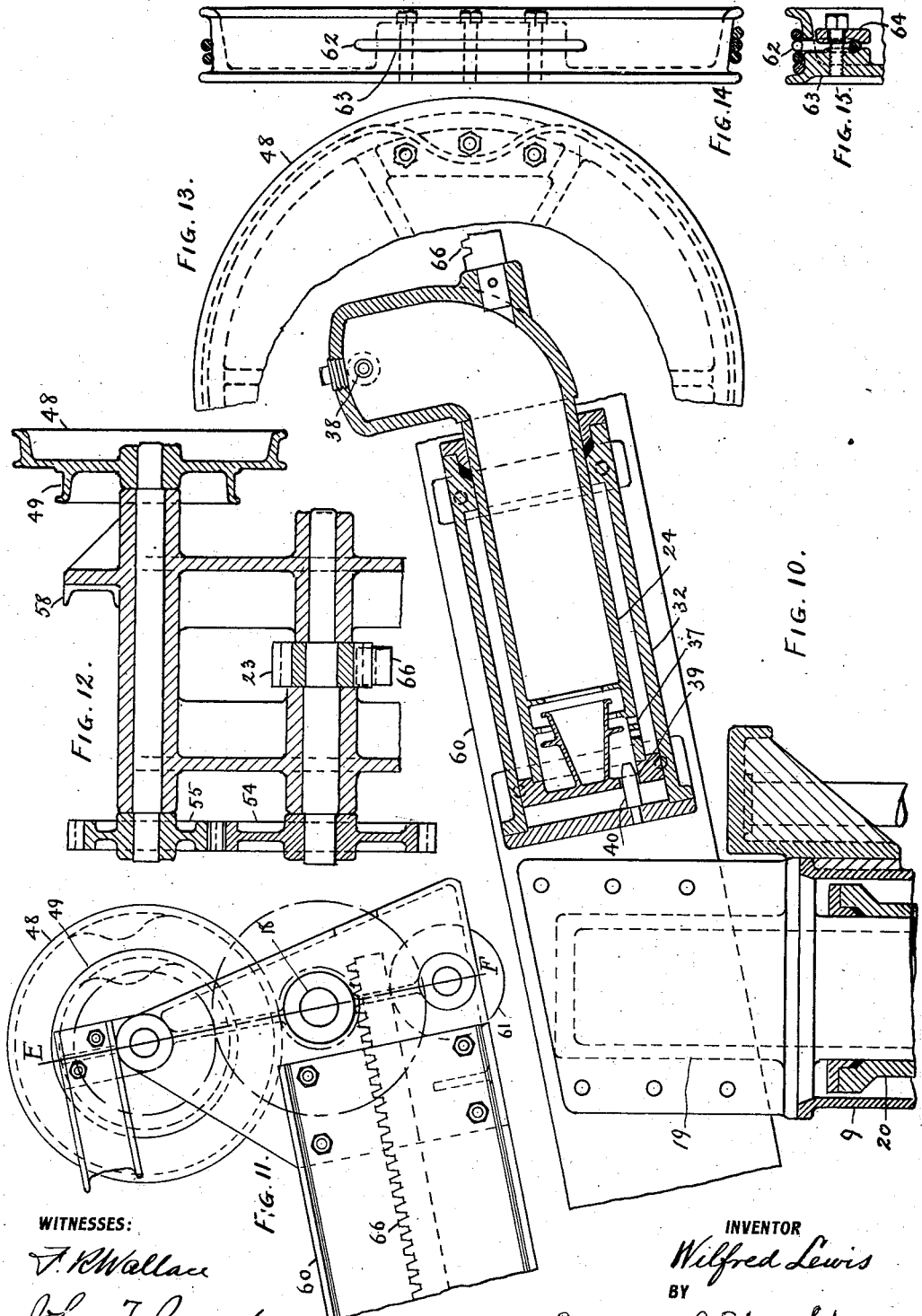

Patented May 20, 1930

1,759,825

UNITED STATES PATENT OFFICE

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA

ROLL-OVER TRAVERSING MECHANISM FOR MOLDING MACHINES

Application filed May 26, 1927. Serial No. 194,360.

This application is a continuation in part of my application S. No. 148,812 filed 17 November, 1926.

The principal objects of the present invention are, first, to provide compact, simple, reliable and comparatively inexpensive rollover, traversing, pattern drawing mechanism for molding machines and more especially for jar ramming and shockless jar ramming machines; second, to provide such a mechanism in which the extent of the lift and of the traverse can be fixed as desired and in which the turnover through 180 circular degrees may be effected within the traverse so fixed and without regard to the extent of the lift; third, to effect the traverse and turnover movements by means of cable gear and without the employment of cable drums of large diameter, in fact with drums of as small diameter as may be desired; and fourth, to simplify, cheapen and at the same time improve the draw or lifting mechanism.

Generally stated, the invention may be said to comprise rollover traversing mechanism for molding machines having a rollover plate or pattern carrier with fixed trunnions and concentric cable drums thereon, a mounting to afford the plate or carrier a turning movement and a traversing motion, and, in use with jar ramming machines, freedom for jarring motion, four cables of which two are connected with said drums for turning the plate or carrier and of which the other two are operatively connected for traversing the plate or carrier, means on the mounting for operating said cables in the same direction and at different speeds to turn the plate or carrier substantially 180 circular degrees while traversing it through any desired distance with any desired diameter of the drums and independent of the lift, and means for raising and lowering said mounting.

The invention also comprises the improvements to be presently described and finally claimed.

In the following description reference will be made to the accompanying drawings forming part hereof and in which Figure 1 is a side view with parts broken away and with parts in section illustrating a molding machine equipped with rollover traversing mechanism embodying features of the invention.

Figure 2 is a top or plan view of the machine shown in Figure 1.

Figure 3 is an end view of the machine shown in Figure 1.

Figure 4 is a side view illustrating a modification.

Figure 5 is a sectional view on the line A—B of Figure 4.

Figure 6 is a plan view of Figure 4 showing a trunnion carrier, or trolley, in section on the line C—D.

Figure 7 is an elevational view showing a modified and preferred form of cable gear.

Figure 8 is top or plan view of Figure 7.

Figure 9 is an end view of Figure 7.

Figure 10 is a view principally in section illustrating a modified arrangement of the cable gear operating cylinders.

Figure 11 is a view illustrating the right hand part of the gear shown in Figure 10.

Figure 12 is a cross section taken on the line E—F of Figure 11.

Figures 13, 14 and 15 are side, edge and detail sectional views of the winding drum shown in Figure 12 drawn to an enlarged scale.

Figure 1:
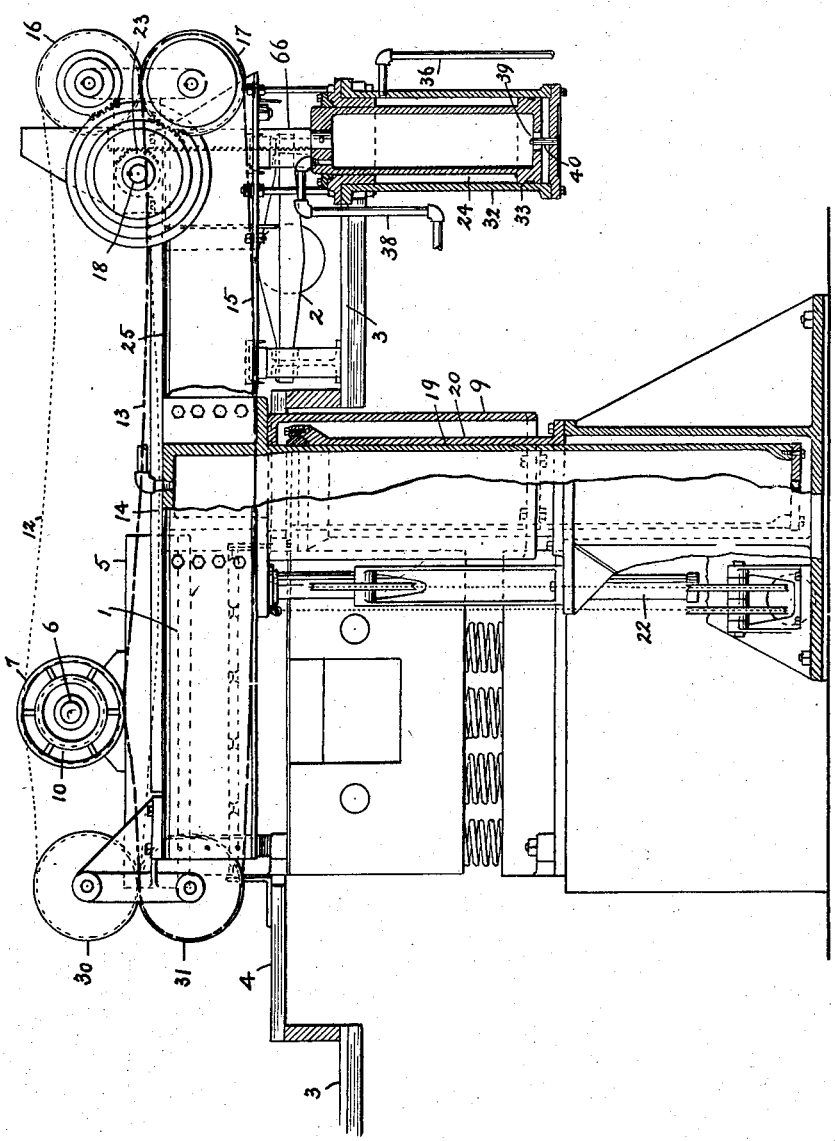

Referring to Figures 1 to 3, the invention is shown in application to a shockless jar ramming machine of which the top of the table is indicated at 1. This is too well understood to require detail description, and its application to a flask receiver, cradle or support 2 is also well understood and requires no specific description. The operating floor 3 is stepped up as at 4 to provide space at the right in Figure 1 for the accommodation of the flask support 2. 5 is a rollover plate or pattern carrier having trunnions 6 and cable drums 7 secured to it. There is a mounting 25 made up as shown of channel bars bolted to the plungers 19 and on which rails 8 are laid to lift and carry the plate or table 5 on the wheels 10, shown in said figures and more particularly in Figure 2, as a part of the mounting. The wheels 10 are turnable on the trunnions 6, and are adapted to travel on the rails 8 between stops for limiting that travel. There are two cables 12 and 13 connected with the drums, 7, and wound in opposite directions. In the case of the cable 12 the slack reach from the idle sheave, 30, is shown at 14, and in the case of the cable 13 the slack reach from the idle sheave, 31, is shown at 15. When it is said that the cables are connected with the drum, the meaning is that they are attached to it and they are also wound in opposite directions around it. The driving sheaves or drums 16 and 17 on the mounting are attached to and pull said cables 12 and 13 in the same direction but at different speeds due to the different relation of the gear wheels by which they are driven from the shaft 18, also carried by the mounting, and the cable 12 is driven faster than the cable 13. The description may be interrupted at this point to remark that with the wheels 10 resting upon the rails 8, if the cables 12 and 13 were pulled toward the right in Figure 1 at the same speed, the carrier plate 5 would be traversed toward the right in Figure 1 without any turning movement. If the cable 13 were fixed and the cable 12 pulled toward the right, the rollover plate 5 would be rolled over and traversed only by the periphery engaged in rolling on the fixed cable 13 while the traversing cable 12 goes twice as far. The statement in the last sentence is illustrative of one advantage of the use of two cables moving in the same direction at different velocities. If the cable 13 were fixed the drum 7 would be traversed its semi-circumference only in turning 180°, and to cover the desired distance from jarring to pattern drawing position such a drum would have to be about three times as large and many times as heavy as the drum illustrated. The idea is to provide ample means for rolling over with a drum of reasonable size and weight because size and weight are highly objectionable, and the differential movement of two cables constitutes a useful and improved means of rolling and traversing the pattern carrier. To cover any desired traverse while making half a turn, the semicircumference of the drum 7 would then have to equal the traverse required, and such a drum would be highly objectionable on account of its size and weight. But when both cables are made to move together at predetermined rates any convenient size of drum can be used and from this it will be understood that by pulling the cables 12 and 13 at different speeds toward the right, the cable 12 faster than the cable 13, the rollover plate 5 can be turned through 180 circular degrees whilst traveling along the rails to any desired position toward the right. In connection with a jar ramming machine the wheels 10 in jarring must clear the rails 8 on which they rest when rolling and traversing, and to provide the necessary clearance the plungers 19 are allowed to drop a little further than is required to deposit the plate 5 on the jarring table 1. The contents of the flask mounted on top of the plate or carrier 5, carrying the pattern can thus be rammed by the jarring machine and at the end of the ramming operation the tracks or rails 8 on the mountings can be raised to meet the wheels, 10, and lift the flask as high as necessary to clear the carrier 5 in rolling over. There are means for raising and lowering the described mounting to permit the parts which it carries or some of them to effect the described rollover and traversing movement of the plate or carrier 5, and, of course, of the flask which it carries. As shown, these means comprise a pair of plungers 19 and cylinders 20 arranged to one side of the table 1 of the jarring machine and a bar 21, Figure 2, connecting the plungers thru the dependent casings 9 to oppose turning movement between said plungers and of the parts of the mounting which they carry, more particularly the rails 8. 22 is rope gear for causing the plungers indicated at 19 in cylinders 20, to rise and fall together. The shaft 18 is shown as driven by a rack 66 and pinion 23 actuated by a plunger 24 in the cylinder 32 carried by the mounting. This plunger has a piston head 33 for trapping liquid to control the speed and slow down as the plate 5 approaches its stop 11 in pattern drawing position. Rail stops 34 and 35 may also be provided as shown in Figure 6 to limit its lateral movement.

A pattern and flask are provided on the top of the rollover carrier or plate 5, and by the top is meant the side or face that is uppermost in Figure 1. Sand is placed in the flask and the mold is rammed by the jarring machine, during which process the cables 12 and 13 are slack enough to permit the drum 7 to rise and fall freely, and, since the plate 5 is pinned to the top 1 of the jarring table there is no tendency for the plate 5 to turn. When rolling and traversing, however, this slack is taken up by the changed position of the cable carriers relative to the drum 7. Thus the cables are automatically tightened to roll and traverse and automatically slackened for jarring. Upon completion of the jar ramming operation the jarring machine leaves the plate or carrier 5 in position to be picked up on the wheels 10 by the rails 8. The pattern drawing plungers 19 are then actuated, raising the mounting and all the parts which it carries to provide for turnover movement of the plate 5, and during this operation the plate 5 is held from turning by the cables 12 and 13 which are attached to it as has been described and also to the sheaves 16 and 17. Then the plunger 24 is actuated drawing the cables 12 and 13, the former faster than the latter, and causing the described rollover and traverse movements of the plate 5 bringing the flask above the flask support 2. By means of the plungers 19 the flask is deposited on the flask support 2 and the pattern may be drawn after unclamping the flask by causing a lifting movement of the plungers 19. The rollover plate and its pattern are then returned to the positions from which they started by a lowering movement of the plunger 24 followed by lowering the plungers 19.

The construction and mode of operation of the modification shown in Figures 4, 5 and 6 are as above described except that the mounting 25, is inclined and that slotted trolley frames 26, having wheels 10ª, are mounted on the rails 8 to engage the trunnion pins 6, which formerly carried the track wheels 10. In this way the stepped up floor shown at 4 in Figure 1 is obviated and the weight of the track wheels 10 in jarring is avoided. The return of the rollover plate by gravity, after drawing the pattern, is also facilitated. These and other advantages gained by this modification make it one preferred form. Here the mechanism for rolling over and traversing becomes also an elevator permitting by its use some reduction in the length of the plungers and cylinders 19 and 20, and a corresponding reduction in cost.

The trolley frame 26, is provided with an upright slot 27, in which the trunnion 6, is placed, with clearance for jarring. In Figure 4 the trunnion is shown as in position for jar ramming with the plate 5 supported by the top 1 of the table of the jar ramming machine. When the mounting 25 is lifted for rollover and traverse movements the lower portion of the wall of the slot 27, lifts and forms a bearing for the trunnion 6. A guide bar 28, Figure 4, passes thru a clearance hole, 29, Figure 5, to hold the trolley upright on the rails 8. In describing this modification the description has been given in the singular but there are, of course, two trolleys and duplicate mountings.

It may be remarked that the speed ratio of the cables may be determined as follows: Letting T=traverse required and S=the semi-circumference of the drum 7, the movement of 13 must be $T-S$ and the movement of 12 must be $T+S$ consequently the speed of 16 in terms of 17 becomes simply $$\frac{T+S}{T-S}.$$

In Figure 1 the rollover cylinder and piston 24 is shown as equipped with a pipe 36 connected to the annular space between the piston and the cylinder wall, and the pipe 38 is connected to the hollow interior of the piston. Pipes 36 and 38 will alternate to pressure and exhaust and are controlled by hand through the intervention of control valves or the like not shown because too well understood to require illustration. Pressure in 38 will traverse to the right in Figure 1, and pressure in 36 will traverse to the left. The bottom of the plunger or piston 24 is provided with an opening 39 into which a clearance pin 40 passes to slow down the movement of the plunger or piston at the end of its downward movement, and at the end of its upward movement the piston head shuts off 36 by covering it and slows down the traverse. In this case there is provided in effect a reversing motor. Referring to Figure 4 there is a choke hole 37 provided in the plunger or piston and gravity is availed of to return the rollover plate 5 to its original position, and in this connection the inclined path is an advantage. In this case there is provided a single acting motor.

The construction and mode of operation of the modification shown in Figures 7 to 12 are as above described in connection with the other figures except as follows:

The trolley frame, 26, is provided with an upright slot, 27, in which the trunnion block 41, is placed with clearance for jarring. In Figure 7 the trunnion is shown as in position for jar ramming with the plate 5 supported by the top 1 of the table of the jar ramming machine. When the mounting 25 is lifted for rollover and traverse movements the lower portion of the wall of the slot, 27, lifts and forms a bearing for the trunnion block 41. An oil pipe, 42, attached to the bearing block 41 passes thru a clearance hole, 43, in trolley frame, 26, and this will hold the trolley in an upright position, anywhere, but it is held more securely under load by the weight upon it, and in the terminal positions by the stop pins 44 and 45.

There is a cable, 46, connected with the drum 7, and a cable, 47, connected with the trolley 26. The cable 46, is actuated by the drum, 48, and the cable 47, by the drum, 49, mounted on the same driving shaft, 50, and these cables are carried around idle sheaves 51 and 52 at the other end of the mounting. The driving drums or sheaves 48 and 49 on the shaft 50 traverse the cables 46 and 47 in the same direction but at different speeds due to the difference in their diameters, and letting T=trolley traverse and S=semi-circumference of the drum, 7, it is evident that the drum 48 must overhaul T+S while the drum 49 overhauls T. Consequently their diameters must be in the ratio of T+S to T and the diameter of 49 must be sufficient to overhaul T for one stroke of the plunger 24 actuating the rack 66 to turn the pinion 23 on the shaft 18. A gear wheel 54 on the pinion shaft 18 engages the gear wheel 55 on the shaft 50 to give 50 any desired rotation and in some cases it may be possible to let the rack 66 engage a pinion on the shaft 50 direct, thus eliminating the intermediate pinion shaft 18 and the gears 54 and 55.

A stop 56 on the mounting, 25, is provided to meet the stop 57 on the rollover plate or carrier 5. These stops set the face of the plate perpendicular to the line of draft in pattern drawing and may be accurately adjusted for alignment.

The strut 58 carries a sand guard 59 and serves to take some of the thrust of the cables upon the bearings of their sheaves. As shown in Figures 10 and 11 the plunger and cylinder and rack 66 are arranged horizontally and are carried by the channel bars 60 of the mounting, thus obviating the provision of room for them in the pit.

The rack is shown as guided by the roll 61. By tapering the face of the winding drums or sheaves, for example as shown, in the case of the drum 48, Fig. 12, any necessary tightening and slackening of the cables for drawing the pattern plate or carrier up to its stop 56 can be provided.

In Figures 13 to 15, a bight of the cable is passed through a slot 62 in the drum or sheave and the bight is clamped between a fixed clamp 63 and a detachable clamp 64 bolted to the fixed clamp, and thus the cable is fastened to the drum or sheave.

In case the jarring machine is to be used without the rollover and traversing attachments, the bolts 65, Figure 7, by which the side rails 60 are bolted to the casings 9 that are connected by the cross bars 21, are removed as is also the pattern plate or carrier and the plungers and side bars are swung or turned, the high end of one towards the low end of the other, and they can be lifted by the plungers 19, thus clearing the table 1 of the jarring machine for the reception of larger flasks.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Rollover traversing mechanism for molding machines comprising a rollover plate, having trunnions and cable drums, a mounting for affording the plate a turning motion and a traversing motion, cables connected with the drums to turn the plate, other cables connected to traverse the plate, means on the mounting for pulling said cables in the same direction and at different speeds to turn the plate or table and to traverse it, and plungers for raising and lowering the mounting.

2. Rollover traversing mechanism for jarring machines comprising a rollover plate having trunnions and cable drums, a mounting for affording the trunnions turning motion and traversing motion and freedom for jarring motion, cables connected with the drums, cables for traversing the plate, means on the mounting for pulling said cables in the same direction and at different speeds to turn the plate and to traverse it and to permit it to be jarred, and means for raising and lowering the mounting.

3. Rollover traversing mechanism for jarring machines comprising a rollover plate having trunnions and cable drums, a slotted trolley frame in which the trunnions have freedom for jarring and are carried to afford them turning and traversing motions, cables connected with the drums, cables connected with the trolley frame, means on the mounting for pulling the cables in the same direction at different speeds to turn the plate and to traverse it, and draw plungers for raising and lowering the mountings.

4. Rollover traversing mechanism for molding machines comprising a rollover plate having trunnions and cable drums, a mounting comprising a trolley frame having a slot in which the trunnions are mounted and which is adapted to afford them turning and traversing motions and freedom for jarring motion, cables connected with the drums, cables connected with the trolley frame, interconnected sheaves on the mounting for pulling the cables in the same direction at different speeds to turn the plate and to traverse it, and draw plungers for raising and lowering the mounting.

5. In mechanism for molding machines a detachable turnover plate and a pair of spaced drawing cylinders and plungers adapted for arrangement to one side of the table of a molding machine, casings depending from the plungers, a bar connecting said casings to oppose turning movement thereof, inclined bars mounted on the plungers and adapted to support the plate, and means for connecting the inclined bars and casings for normal operation and for disconnecting the casings and inclined bars to afford turning movements of the inclined bars for operation in the absence of the plate.

6. Rollover traversing mechanism for molding machines comprising a rollover plate having trunnions and cable drums, a mounting for affording the plate a turning motion and a traversing motion, cables connected with the drums, cables for traversing the plate, a pair of interconnected sheaves on the mounting for pulling said cables in the same direction and at different speeds to turn the plate and to traverse it, a piston and cylinder arranged in the plane of the mounting and adapted to operate the sheaves, and means for raising and lowering the mounting.

7. Rollover traversing mechanism for molding machines comprising a pattern plate having trunnions, a mounting providing a substantially rectilinear and generally inclined path adapted to be traversed by the trunnions and in respect to which the trunnions are turnable about their own axes, cable means for traversing the trunnions in said path, and cables for turning the trunnions through substantially one hundred and eighty circular degrees during their traversing motion.

8. Rollover traversing mechanism for molding machines comprising a pattern plate having trunnions, a mounting providing a substantially rectilinear and generally inclined path adapted to be traversed by the trunnions and in respect to which the trunnions are turnable about their own axes, cable means for traversing the trunnions in said path, cable means independent of the length of the path for turning the trunnions through substantially one hundred and eighty circular degrees during their traversing motion, mechanism operatively independent of said cable means and adapted to raise and to lower said mounting, and a plunger and cylinder adapted to operate the cable means and carried by and disposed in the plane of the mounting.

WILFRED LEWIS.